March 17, 1931. H. W. WILDMAN 1,796,550
LAWN MOWER ATTACHMENT
Filed April 7, 1927
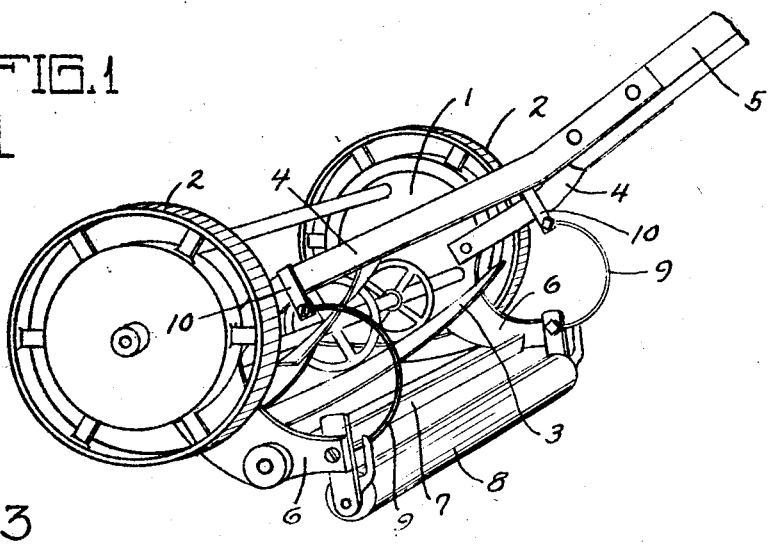
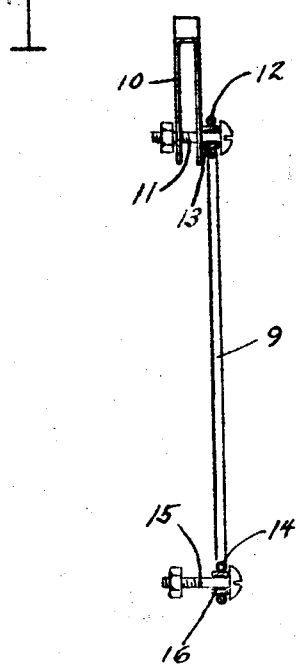
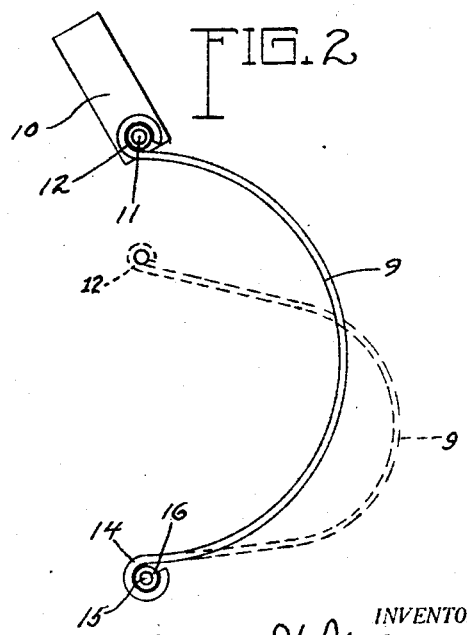
INVENTOR.
Henry W. Wildman.
BY Walter N. Haskell,
his ATTORNEY.

Patented Mar. 17, 1931

1,796,550

UNITED STATES PATENT OFFICE

HENRY W. WILDMAN, OF PROPHETSTOWN, ILLINOIS

LAWN-MOWER ATTACHMENT

Application filed April 7, 1927. Serial No. 181,880.

My invention has reference to lawn mower attachments, and aims to increase the efficiency and ease of operation of such machines. In machines of this type of a common build, movement is imparted to the reel carrying the cutting blades from the carrying wheels, through the medium of gear devices. It is the common experience of the users of such machines that upon encountering an obstacle there is a tendency of the gear pinions to climb, or move upwardly upon the large gear wheel, raising the rear part of the machine, including the cutter-bar, and resulting in an irregular cutting of the grass. This is particularly liable to happen when cutting grass of an unusually heavy or tough character, and adds greatly to the difficulty of operating the machine. By the use of the present invention this difficulty is overcome, and the machine proceeds in a regular course, making the operation less arduous and resulting in the cutting of the grass at a uniform height.

In the drawings:—

Fig. 1 is a perspective view of a lawn mower equipped with the invention.

Fig. 2 is an enlarged view of the invention, detached.

Fig. 3 is an edge view of the same.

The reference number 1 indicates the frame of a lawn mower of conventional type, supported on carrying wheels 2, and 3 is the knife reel thereof, operated from said wheels. Connected with the frame 1 are handle frames 4, to which is attached a handle 5 shown partly broken away. Projecting rearwardly is a pair of arms 6, carrying a cutter-blade 7, and supported by a roller 8.

A curved arm 9 is attached at its upper end to the handle frame 4 by means of a clamp 10, secured to the frame by a bolt 11, passing through openings in said clamp and through an eye 12 formed on the end of the arm 9. To insure freedom of movement of said arm a thimble 13 is interposed between the eye and bolt. The opposite end of the arm 9 is similarly formed into an eye 14 secured to the frame 6 by a bolt 15, which may be the bolt commonly used at that point. A thimble 16 is interposed between the eye 14 and bolt 15.

The arm 9 possesses a limited amount of resiliency, permitting a corresponding flexibility of the movement of the cutter-bar frame and roller, in passing over inequalities, but said arm interferes with any pronounced movement of the cutter-bar upwardly, and tends to hold the machine to its work. A better and steadier result is secured by equipping each end of the machine with one of the arms 9, as shown in Fig. 1 of the drawings.

The arm 9 is formed by bending a wire of suitable size and strength into a bowed form, when positioned in the machine, giving to such arm a desired amount of tension. This tension increases but slightly in the operation of the machine on account of the flexibility of the arm, which bends or flexes rearwardly upon the ends of the arm approaching each other, as shown in broken lines in Fig. 2 of the drawings. This off-sets to a large extent the compressive force, and the tension of the arm is not materially increased. The initial force of the pair of arms is such as to resist the tendency of the cutter-bar to move upwardly, but if there is any such movement the weight of the cutter-bar and frame will tend to return the same to its normal position without any assistance from the arms 9. On the other hand, if it is desired to run the machine with the handle 5 at a lower point, the consequent compression of the spring arms will not react thereon materially, to force the same upwardly. The expansive force of the arms between their pivoted ends will be practically balanced at all times.

It will be observed that the device can be readily applied to a machine already in use, and will not interfere in any way with the desired operation of the machine. It is also simple in form, and can be produced at a minimum of cost of manufacture.

What I claim as my invention, and desire to secure by Letters Patent, is:

In combination with the handle-frame and cutter-bar of a lawn-mower, a clamp removably connected with the end of the handle-frame, and a bow-spring pivoted at one of its ends to said clamp and at the other end to the cutter-bar frame, said bow-spring bending under compression of its ends without materially increasing the tension thereof.

In testimony whereof I affix my signature.

HENRY W. WILDMAN.